(12) United States Patent
Brandt (10) Patent No.: US 8,321,946 B2
(45) Date of Patent: Nov. 27, 2012

(54) METHOD AND SYSTEM FOR PREVENTING IDENTITY THEFT IN ELECTRONIC COMMUNICATIONS

(75) Inventor: William M. Brandt, Kettering, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2434 days.

(21) Appl. No.: 10/729,398

(22) Filed: Dec. 5, 2003

(65) Prior Publication Data

US 2005/0125686 A1 Jun. 9, 2005

(51) Int. Cl.
*G06F 7/04* (2006.01)
*G06F 21/00* (2006.01)
(52) U.S. Cl. .......................... 726/26; 713/182
(58) Field of Classification Search ................. 726/2, 3, 726/27, 26; 713/182
See application file for complete search history.

(56) References Cited

U.S. PATENT DOCUMENTS

| | | | | |
|---|---|---|---|---|
| 4,218,738 A | * | 8/1980 | Matyas et al. .................. 705/72 |
| 5,657,389 A | * | 8/1997 | Houvener ...................... 713/186 |
| 5,974,148 A | * | 10/1999 | Stambler ........................ 705/75 |
| 6,026,166 A | * | 2/2000 | LeBourgeois ................. 713/156 |
| 6,041,412 A | * | 3/2000 | Timson et al. .................... 726/3 |
| 6,119,233 A | * | 9/2000 | Hawkins ........................ 726/26 |
| 6,539,101 B1 | * | 3/2003 | Black ............................. 382/124 |
| 6,769,060 B1 | * | 7/2004 | Dent et al. ..................... 713/168 |
| 6,853,739 B2 | * | 2/2005 | Kyle ............................... 382/115 |
| 6,886,096 B2 | * | 4/2005 | Appenzeller et al. ......... 713/170 |
| 6,993,652 B2 | * | 1/2006 | Medvinsky ................... 713/155 |
| 7,017,041 B2 | * | 3/2006 | Sandhu et al. ................ 713/156 |
| 7,043,453 B2 | * | 5/2006 | Stefik et al. ..................... 705/52 |
| 7,249,380 B2 | * | 7/2007 | Yang ............................... 726/25 |
| 7,340,438 B2 | * | 3/2008 | Nordman et al. ............... 705/64 |
| 2001/0027519 A1 | * | 10/2001 | Gudbjartsson et al. ....... 713/168 |
| 2001/0032192 A1 | * | 10/2001 | Putta et al. ....................... 705/76 |
| 2001/0037469 A1 | * | 11/2001 | Gupta et al. .................. 713/202 |
| 2002/0004831 A1 | | 1/2002 | Woodhill ....................... 709/229 |

(Continued)

FOREIGN PATENT DOCUMENTS

EP 1292090 3/2003

(Continued)

OTHER PUBLICATIONS

PCT International Search Report, PCT/US2004/036921, Feb. 23, 2005, 4 pages.

(Continued)

*Primary Examiner* — Techane Gergiso (57) ABSTRACT

Preventing identity theft in electronic communications sequences (180) involves generating a consumer identifier (126) for an individual (92) from a trusted service (82), including a primary key (128), a unique identifier (130), and a consumer-defined sequence (132). The consumer-defined sequence (132) allows the individual (92) to control use of the consumer identifier (126) by third parties, such as business entities (112). The method and system further allows business entities (114) to verify use of the consumer identifier (126) by first initiating a verification process (196) via a secure connection (110). Verification includes comparing (200) the consumer identifier (126) with a pre-determined set of database records (86, 88, and 90). If the requesting business (108) has registered with the trusted service (82), the invention presents a positive or negative confirmation (208) to the requesting business (108) according to the inquiry (204). Then, the invention permits confirming (210) the requested information relating to the individual (92) via the secure connection (98, 102, 106), conditioned upon the requested information having previously been authorized by the individual for presenting to the requesting business (108).

20 Claims, 4 Drawing Sheets

U.S. PATENT DOCUMENTS

| | | | |
|---|---|---|---|
| 2002/0059146 A1* | 5/2002 | Keech | 705/64 |
| 2002/0095569 A1* | 7/2002 | Jerdonek | 713/155 |
| 2003/0046589 A1* | 3/2003 | Gregg | 713/201 |
| 2003/0051164 A1* | 3/2003 | Patton | 713/201 |
| 2003/0061484 A1* | 3/2003 | Noble | 713/168 |
| 2003/0070068 A1* | 4/2003 | Medvinsky | 713/155 |
| 2003/0070101 A1 | 4/2003 | Buscemi | 713/202 |
| 2003/0072450 A1* | 4/2003 | Maggenti | 380/270 |
| 2003/0135731 A1* | 7/2003 | Barkan et al. | 713/155 |
| 2003/0135740 A1* | 7/2003 | Talmor et al. | 713/186 |
| 2003/0158960 A1* | 8/2003 | Engberg | 709/237 |
| 2003/0190046 A1* | 10/2003 | Kamerman et al. | 380/286 |
| 2004/0002903 A1* | 1/2004 | Stolfo et al. | 705/26 |
| 2004/0003251 A1* | 1/2004 | Narin et al. | 713/172 |
| 2004/0006699 A1* | 1/2004 | von Mueller et al. | 713/185 |
| 2004/0010696 A1* | 1/2004 | Cannon et al. | 713/186 |
| 2004/0025053 A1* | 2/2004 | Hayward | 713/201 |
| 2004/0059941 A1* | 3/2004 | Hardman et al. | 713/201 |
| 2004/0064335 A1* | 4/2004 | Yang | 705/1 |
| 2004/0083184 A1* | 4/2004 | Tsuei et al. | 705/74 |
| 2004/0098589 A1* | 5/2004 | Appenzeller et al. | 713/170 |
| 2004/0143738 A1* | 7/2004 | Savage et al. | 713/168 |
| 2004/0162984 A1* | 8/2004 | Freeman et al. | 713/175 |
| 2004/0215981 A1* | 10/2004 | Ricciardi et al. | 713/202 |
| 2005/0033702 A1* | 2/2005 | Holdsworth | 705/67 |
| 2005/0066165 A1* | 3/2005 | Peled et al. | 713/165 |
| 2005/0125686 A1* | 6/2005 | Brandt | 713/200 |
| 2006/0075255 A1* | 4/2006 | Duffy et al. | 713/186 |
| 2006/0107069 A1* | 5/2006 | Hoffman | 713/186 |
| 2006/0112434 A1* | 5/2006 | Banker et al. | 726/27 |

FOREIGN PATENT DOCUMENTS

FR   2799914   4/2001

OTHER PUBLICATIONS

International Search Report, PCT/US2004/038331, Aug. 24, 2005, pp. 1-5.

PCT/US2004/036921, Written Opinion of the International Searching Authority, Jan. 24, 2007, pp. 1-7.

* cited by examiner

| Consumer Id | 126 | W543-04-R511-Y2-CODE | 124 |
|---|---|---|---|
| Primary key issued by the trusted service | 128 | W543-04-R511 | 134 |
| Business identity characteristic established by business rules | 130 | Y2 | 136 |
| Consumer defined sequence | 132 | CODE | 138 |

*FIG. 3*

| Consumer Identifier System Record Fields | |
|---|---|
| Primary Key | 142 |
| User-Defined Sequence | 144 |
| Consumer Address {Street, City, Zip, etc} | 146 |
| consumer Photo | 148 |
| Fingerprint(s) | 150 |
| Name {Last, Name, Middle Initial} | 152 |
| Phone | 154 |
| Birth Date | 156 |
| Place of Birth | 158 |
| Social Security Number | 160 |
| User Defined Password (Encrypted) | 164 |
| Email Address | 162 |

METHOD AND SYSTEM FOR PREVENTING IDENTITY THEFT IN ELECTRONIC COMMUNICATIONS

TECHNICAL FIELD OF INVENTION

The invention, in general, relates to a method and system for preventing identity theft in electronic communications and, more particularly, to a method and system for identity theft prevention that permits a consumer to control the use of and access to his/her electronic identity and related information

BACKGROUND OF THE INVENTION

Identity theft is the fastest growing crime in America according to the Federal Trade Commission. Affecting one out of every four American families, identity theft is simply the theft of information such as a name, date of birth, social security number, or a credit card number. Armed with this consumer information, criminals and terrorist organizations commit crimes against individuals, businesses and financial institutions in over hundreds of millions of dollars in damages.

Today, creditors issue credit on three key pieces of information, including a valid name, an address, and a social security number. Using a social security number, creditors validate consumer identity and credit history through a credit reporting agency, such as Equifax Corporation, Experian, Inc. (formerly TRW, Inc.), or Trans Union Corporation.

Victims of identity theft often do not realize they have become victims until they attempt to obtain financing on a home or a vehicle. Only then, when a lender tells them that their credit history makes them ineligible for a loan, do they realize something is terribly wrong. When they review their credit report, they first become aware of credit cards for which they have never applied, bills long overdue, unfamiliar billing addresses, and inquiries from unfamiliar creditors. Even if they are able to identify the culprit, it may take months or years, tremendous emotional anguish, many lost financial opportunities, and large legal fees, to clear up their credit history.

Identity theft occurs in many ways, ranging from the careless sharing of personal information to intentional theft of purses, wallets, mail, or digital information. In public places, for example, thieves engage in "shoulder surfing" by watching from nearby locations as their victims use telephone calling card or credit card numbers or may listen in on conversation if the victim gives his credit card number over the telephone. Inside victim's home, thieves obtain information from personal computers while the unknowing victims are on-line. Outside your home, thieves steal your mail, garbage, or recycling. Outside medical facilities or businesses, thieves engage in "dumpster diving" going through garbage cans, large dumpsters, or recycling bins to obtain identity information which includes credit or debit card receipts, bank statements, medical records like prescription labels, or other records that bear your name, address, or telephone number.

A need exists, therefore, for a method and system for eliminating identity theft and opportunities to conduct identity theft.

SUMMARY OF THE INVENTION

The invention, in general, relates to a method and system for preventing identity theft in electronic communications and, more particularly, to a method and system for an identity theft prevention service that permits a consumer to control the use and access to his/her electronic identity and related information.

According to one aspect of the invention, there is provided a method and system for preventing identity theft in electronic communications which sequences an encryption key transaction from a trusted service. The encryption key transaction generates a consumer identifier for an individual by first issuing a primary key to the individual from the trusted service. The trusted service issues to the individual a unique identifier. In addition, the trusted service permits the individual to generate and maintain a consumer-defined sequence whereby the individual controls commercially-related use of the consumer identifier by third parties, such as business entities.

The method and system further allow third parties to verify commercially-related use of the consumer identifier by first initiating a verification process from the requesting business entity via a secure connection. Then, the invention further compares the consumer identifier with a pre-determined set of database records in response to initiating the verification process. If the requesting business has registered with the trusted service, the invention presents a positive or negative confirmation to the requesting business. Then, the invention permits confirming the requested information relating to the individual via the secure connection, conditioned upon the requested information having previously been authorized by the individual for presenting such confirmation to the requesting business.

According to another aspect of the present invention, there is provided an identity theft prevention method and system that provides to a consumer a consumer identifier. The consumer may purchase and, consequently, "own" the consumer identifier. The consumer identifier serves as a unique transaction signature for associating with a trusted identity service provided by a commercial vendor. However, the consumer maintains control of transactions authorized under his identity. Because the consumer manages his identity information, he can exercise direct control over his financial and credit portfolio. The method and system of the present invention further assist the consumer and businesses that may use the consumer identifier for business purposes the ability to identify fraudulent activity relating to the consumer's credit portfolio. In doing so, the present invention provides a secure layer of protection from credit and financial losses due to consumer identity theft. In providing the consumer identifier and the associated transaction and verification assurance, a trusted service may leverage competencies in information technology and relationships with credit and financial institutions.

Other aspects of the present invention a consumer's establishment and management of a his/her identity information from a remote or home personal computer through a secure internet connection to a trusted web-hosted database application provided by a trusted service provider. The method and system permit the consumer to monitor verification attempts relating to his consumer identity from various sources, including, for example, credit agencies, mortgage lenders, banks, other businesses. The present invention further provides to financial and credit institutions a trusted consumer identification verification service for creditors and financial services. The present invention has application for consumers throughout the digital economy as an additional service that financial institutions and the like can provide for to their customers.

A technical advantage that the present invention provides to consumers includes protecting their credit, while providing to banks the ability to prevent potential loss of billions of dollars per year from the criminal activities and associated identity theft losses.

Another technical advantage of the present invention is its providing an identification verification application and service that may be tailored and promoted in other business markets outside of the financial and credit industries. For example, the present invention may be modified to identify legitimate personnel requiring access to secure facilities of an organization, or it might be used to identify foreign nationals entering our country.

Yet a further technical advantage of the present invention is the ability to have accounts that provide transaction verification services among our various clients involved in e-banking, credit card transactions, automated payments, etc., while harnessing the key elements of a new, unique package that uses supporting technologies and services in protecting a consumer's identity. The present invention provides businesses and credit verification institutions with a trusted source of information for identifying individuals who conduct business and commercial transactions in the global economy.

Other technical advantages are readily apparent to one skilled in the art from the following FIGURES, description, and claims.

BRIEF DESCRIPTION OF THE DRAWINGS

For a more complete understanding of the present invention and advantages thereof, reference is now made to the following description, which is to be taken in conjunction with the accompanying drawings and in which like reference numbers indicate like features and further wherein.

DETAILED DESCRIPTION OF PREFERRED EMBODIMENT

The preferred embodiment of the present invention and its advantages are best understood by referring to FIGS. 1 through 5 of the drawings, like numerals being used for like and corresponding parts of the various drawings.

Figure 1:
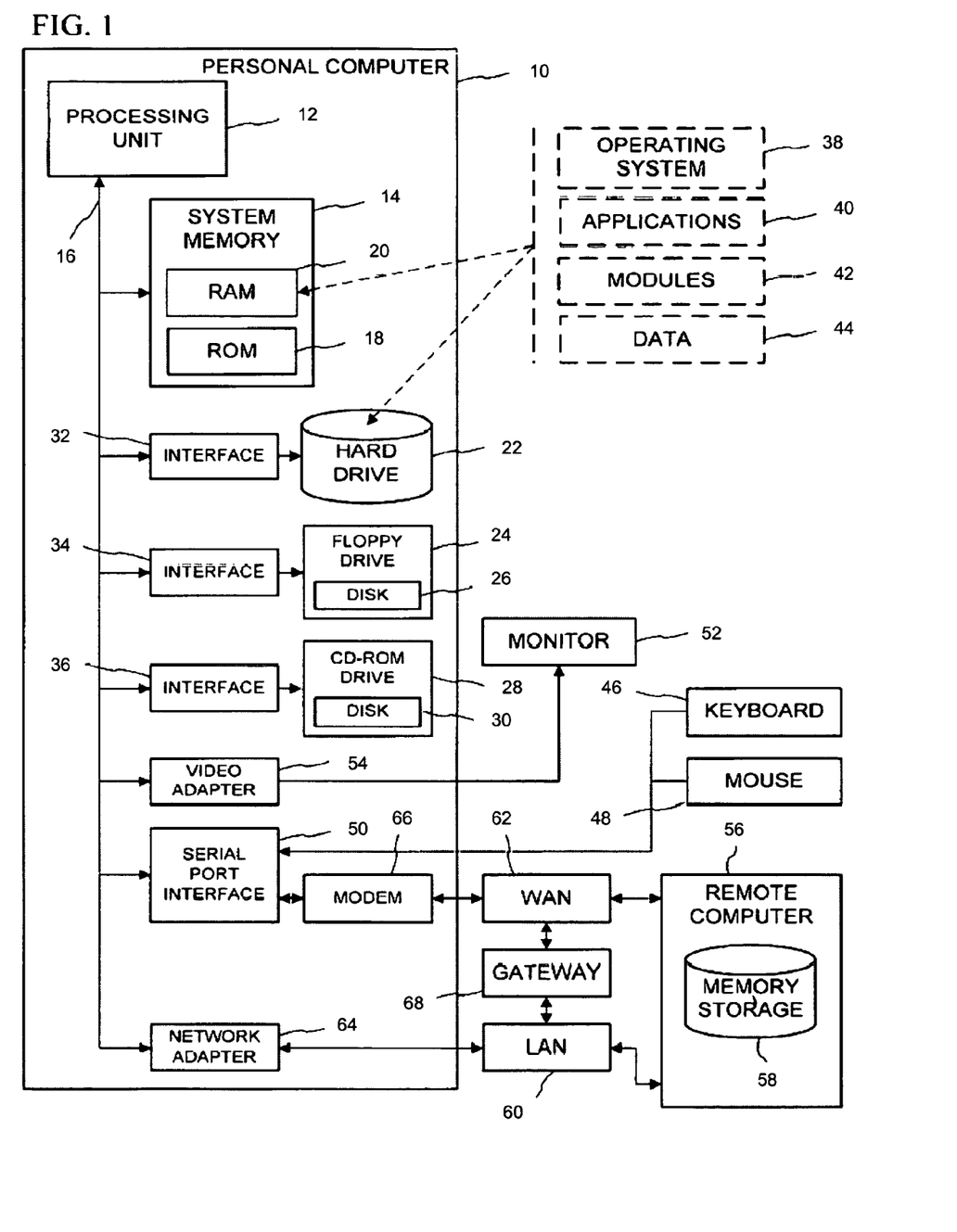
FIG. 1 illustrates a general purpose computing system that may be part of a network of such computing systems for employing the method and system for preventing identity theft of the present invention.

FIG. 1 illustrates a general purpose computing system that may be part of a network of such computing systems for employing the present invention's method and system for preventing identity theft. By associating a network of general-purpose computers 10, an example of which appears below in FIG. 2, the present invention prevents the unauthorized access and use of consumer information. In such an electronic conveyancing environment as established by the present invention, at least two such computers may be operated at different locations within a given geographical or similarly bounded area.

With reference to FIG. 1, general-purpose computer 10 may be a personal computer, a laptop, palmtop, or other set top, server, mainframe, and other variety computer, and include processing unit 12, system memory 14, and system bus 16 coupling various system components including system memory 14 to the processing unit 12. Processing unit 12 may be any of various commercially available processors, including Intel®x86, Pentium® and compatible microprocessors from Intel® and others, including Cyrix®, AMD® and Nexgen®; MIPS® from MIPS Technology®, NEC®, Siemens®, and others; and the PowerPC® from IBM and Motorola. Dual microprocessors and other multi-processor architectures also can be used as the processing unit 12.

System bus 16 may be any of several types of bus structures including a memory bus or memory controller, a peripheral bus, and a local bus using any of a variety of conventional bus architectures such as PCI, VESA, AGP, Microchannel, ISA and EISA, to name a few. System memory 14 includes read only memory (ROM) 18 and random access memory (RAM) 20. A basic input/output system (BIOS), containing the basic routines helping to transfer information between elements within the computer 10, such as during start-up, is stored in ROM 18.

Computer 10 further includes a hard disk drive 22, a floppy drive 24, e.g., to read from or write to a removable disk 26, and CD-ROM drive 28, e.g., for reading a CD-ROM disk 30 or to read from or write to other optical media. The hard disk drive 22, floppy drive 24, and CD-ROM drive 28 are connected to the system bus 16 by a hard disk drive interface 32, a floppy drive interface 34, and an optical drive interface 36, respectively. The drives and their associated computer-readable media provide nonvolatile storage of data, data structures, computer-executable instructions, etc., for computer 10. Although the description of computer-readable media provided above refers to a hard disk, a removable floppy and a CD, those skilled in the are may appreciate other types of media which are readable by a computer, such as magnetic cassettes, flash memory cards, digital video disks, Bernoulli cartridges, and the like, being used in the exemplary operating environment.

A number of program modules may be stored in the drives and RAM 20, including an operating system 38, one or more application programs 40, other program modules 42, and program data 44. A consumer may enter commands and information into the computer 10 through a keyboard 46 and pointing device, such as mouse 48. Other input devices (not shown) may include a microphone, joystick, game pad, satellite dish, scanner, or the like. These and other input devices are often connected to the processing unit 12 through a serial port interface 50 coupling to the system bus, but possibly connecting by other interfaces, such as a parallel port, game port or a universal serial bus (USB). A monitor 52 or other type of display device is also connected to the system bus 16 via an interface, such as a video adapter 54. In addition to the monitor, computers typically include other peripheral output devices (not shown), such as speakers and printers.

Computer 10 may operate in a networked environment using logical connections to one or more remote computers, such as a remote computer 56. Remote computer 56 may be a server, a router, a peer device or other common network node, and typically includes many or all of the elements described relative to the computer 10, although only a memory storage device 58 has been illustrated in FIG. 1. The logical connections depicted in FIG. 1 include a local area network (LAN)

60 and a wide area network (WAN) 62. Such networking environments are commonplace in offices, enterprise-wide computer networks, intranets and the Internet.

When used in a LAN networking environment, the computer 10 is connected to the LAN 60 through a network interface or adapter 64. When used in a WAN networking environment, computer 10 typically includes a modem 66 or other means for establishing communications (e.g., via the LAN 60 and a gateway or proxy server) over the wide area network 62, such as the Internet. Modem 66, which may be internal or external, is connected to the system bus 16 via the serial port interface 50. In a networked environment, program modules depicted relative to the computer 10, or portions thereof, may be stored in the remote memory storage device 58.

Those skilled in the art may appreciate the network connections shown as being exemplary, wherein other means of establishing a communications link between the computers may be used. FIG. 1 only provides one example of a computer useful for employing the teachings of the present invention. The invention may be used in computers other than general-purpose computers, as well as on general-purpose computers without conventional operating systems.

The present invention provides a consumer with the ability to establish and manage his consumer identity information from his home personal computer through a secure internet connection to a trusted web-hosted database application or similar service. The method and system of the present invention permit monitoring verification attempts of his consumer identity from various sources (credit agencies, mortgage lenders, banks, businesses, etc), as well as provide financial and credit institutions with a trusted consumer identification verification service for creditors and financial services. The present invention provides a customer focus, so the service associated with the consumer identifier may be directly marketed to credit consumers who have already experienced loss to identity theft.

Figure 2:
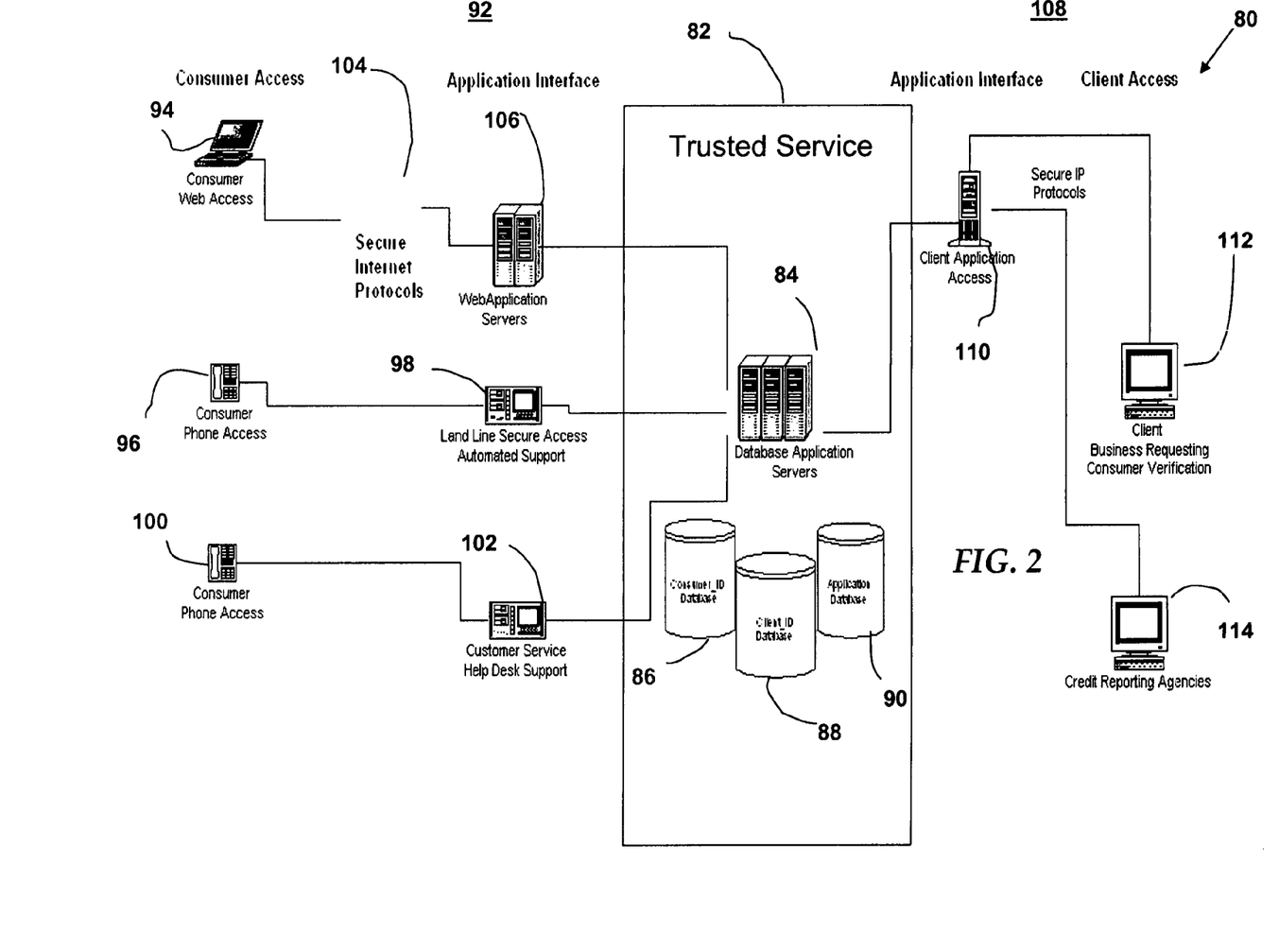
FIG. 2 shows an electronically connected network illustrating an environment capable of supporting the consumer identifier and trusted service method and system of the present invention for preventing identity theft.

FIG. 2 shows an electronically associated network for illustrating an environment capable of supporting the consumer identifier method and system of the present invention for preventing identity theft. Within network environment 80, trusted service 82 provides the necessary databases and servers for interfacing between consumers and clients that may perform the steps of the present invention. Thus, within trusted service 82 are database application servers 84 which serve consumer identifier database 86, client identifier database 88 and application database 90.

On consumer side 92 appear various ways of conducting or performing consumer access to trusted service 82. These include consumer web access 94, consumer phone access 96 to a landline secure access automated support 98, as well as consumer phone access 100 to consumer service help desk support 102. Through secure internet protocols 104, consumer web access 94 connects with application interface of web application servers 106. Thus, trusted service 82 interfaces with the various application interfaces of web application servers 106, landline secure access automated support 98, and customer service help desk support 102.

On client side 108 of network environment 80 appear the application interface of client application access 110, which interfaces the secure IP protocols of client requesting business 112, which may desire consumer verification data, and client recording agencies 114, which may desire to record consumer credit data. Within an environment such as secure environment 80 of FIG. 2, the present invention has applications which are further described in exemplary fashion below in FIGS. 3 through 5.

The services that secure environment 80 may support include trusted travel services, financial transaction services, as well as electronic consumer banking. The present invention provides secure private key encryption and network protocols that rely on information stored on a secure RBMS database system. The hardware of trusted service 82 for supporting the consumer identifier system of the present invention, may reside on web servers, such as database application servers 84, which trusted service 82 manages and maintains. Within secure environment 80, trusted service 82 monitors and audits consumer identifier transaction requests and makes appropriate reports to consumers regarding the use of the consumer identifier. Trusted service 82 also initiates and updates all necessary background checks and secure operation procedures through the aid of a staff of system administrators and developers. Final configuration and design of the consumer identifier network is collaborated and established by trusted service 82. The present invention may also provide eMail notification to the consumer after each consumer identifier verification. Also, there may be Electronic Data Interchange, or EDI notification to business or financial institution regarding positive or negative verification of consumer data requests.

The consumer identifier of the present invention is an alphanumeric sequence including, in the preferred embodiment, three components: (1) a primary key, (2) a business identity characteristic established by trusted service 82, and (3) a consumer-defined sequence, which a consumer manages through trusted service 82. Using the consumer identifier and the identity services provided by trusted service 82, a consumer maintains control of transactions authorized under his identity. Identity services provided by trusted service 82 through the consumer identifier may include several levels of verification. For example, a first level of verification may include the comparison of the consumer identifier, including the consumer-defined sequence, with database records such as those of consumer ID database 86, client ID database 88, and application database 90 of trusted service 82. In such a process, trusted service 82 presents positive or negative confirmation to requesting business 112, which also must be registered with trusted service 82. Such confirmation may be, for example, via a secure connection, such as client application access 110 from an Internet browser to include the consumer's name, photograph and address. An example of a second level of verification may be to compare the consumer identifier, including the consumer-defined sequence, with database records which may include fingerprint(s) provided to the verifying entity with fingerprints on record at trusted service 82.

Figure 3:
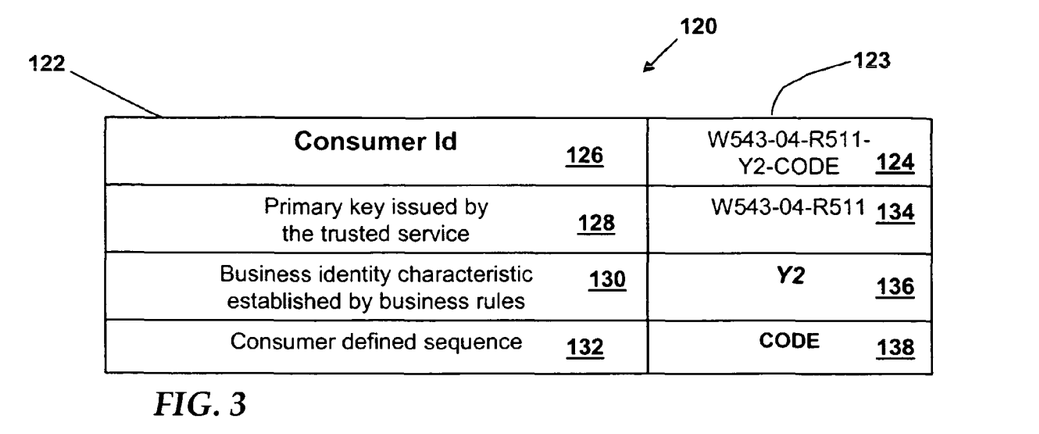
FIG. 3 presents one example of the consumer identifier of the present invention.

FIG. 3 provides table 120, which includes column 122 detailing the various components of the consumer identifier 126 of the present invention. In table 120, column 123 illustrates one example of a consumer identifier, here consumer identifier example 124, which is consistent with the teachings of the present invention. Thus, in column 122 and under the consumer identifier 126 header appears a header for primary key portion 128 which forms the first part of the consumer identifier 126. The business identity characteristic and consumer-defined sequence headers denote the presence in consumer identifier 126 of a business identity characteristic 128 and a consumer-defined sequence 132, respectively, which are structural portions of consumer identifier 126.

In column 123 is a consumer identifier example 124, which in this instance is "W543-04-R511-Y2-CODE". Thus, within this example, the portion "W543-04-R511" provides a primary key portion 128 of consumer identifier example 124. The next portion 136, in this instance, "Y2," is the business identity characteristic portion of consumer identifier example 124. The final portion "CODE" represents a consumer-defined sequence of consumer identifier example 124.

Trusted service 82, which may be a company such as EDS Corporation or a similar provider of trusted software content, preferably creates consumer identifier 126. By logging on to or otherwise accessing trusted service 82 website or other conduit for accessing securely consumer identifier 126, the consumer or user may modify consumer-defined sequence 132 of consumer identifier 126. In the preferred embodiment, the consumer may also use security algorithms of trusted service 82 to verify or prevent an unauthorized user from modifying the consumer-defined sequence 132 of consumer identifier 126.

Once the consumer establishes consumer identifier 126—including primary key portion 128, business identity portion 130, and consumer-defined sequence 132—he has a number of options available to him. Consumer identifier 126 may, for example, have a predetermined expiration feature. Thus, after a specified number of attempts for verification, consumer identifier 126 may require updating. If a requesting business 112 desires to provide credit or another type of business service to the consumer, the requesting business 112 seeking to provide such service may discover that the consumer identifier 126 has expired. In that event, the requesting business 112 would inform the consumer that the consumer identifier 126 failed to function.

The requesting business 112 could then request that the consumer update consumer identifier 126. In response, the consumer could visit or access trusted service 82 via a secure remote location and update the consumer identifier 126. Upon updating or otherwise changing the consumer identifier 126, the consumer may store the updated consumer identifier 126 and then notify the requesting business 112 of the update.

There also may be differing levels of verification through the use of consumer identifier 126. A first verification may require that a requesting business 112 obtain name, address, and photographic information relating to the consumer. At another level of verification, there may be biometric or fingerprint data or other types of unique identification records or indicia that verifies to the requesting business that the consumer is as represented. Thus, for this new information a requesting business 112 may interface trusted service 82 at either the first or second verification level to acquire or verify trusted information relating to the consumer.

Consumer identifier 126 is not a national identifier per se in the sense that the United States government issues and manages consumer identifier 126. Instead, trusted service 82 issues consumer identifier 126 as an alphanumeric-identification number. As a result, trusted service 82 and the consumer manage the functions and structures relating to consumer identifier 126. The consumer may purchase the rights to consumer identifier 126 as a means to protect his/her consumer or business identity. As such, the consumer "owns" consumer identifier 126 and controls its use.

The consumer identifier 126 does not and should not replace the official government-issued identifiers, such as that provided by the social security identification system. Consumer identifier 126, instead, allows a trusted service 82 to provide business transaction assurances for businesses and their customers. Consumer identifier 126, therefore, provides a key transaction sequence by which a consumer links to trusted service 82.

Consistent with concepts of the consumer identifier 126 of the present invention, there may be a number of consumer identifier record fields which may be held within the consumer ID database 86, client ID database 88, and/or application database 90 of trusted service 82. These fields may include, for example, fields containing primary key portion 128, as well as business identity portion 130, consumer define sequence code 132, as well as specific information relating to the individual. This specific information may be, for example, the consumer's address, a photograph of the consumer, fingerprints relating to the consumer, the consumer's complete name, telephone numbers, as appropriate, birth date, place of birth, social security number, consumer-defined password which may or may not be encrypted, and email address. These are just examples of information, as provided in FIG. 4, which may be associated with consumer identifier 126.

Figure 4:
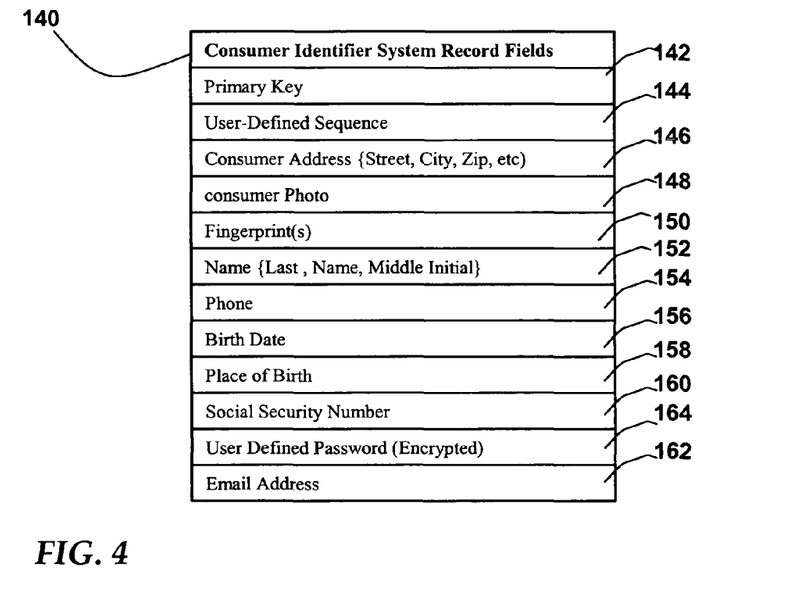
FIG. 4 depicts an example of the consumer identifier record fields that may associate with the consumer identifier and trusted service of the present invention.

FIG. 4, therefore, illustrates Consumer Identifier System Record fields 140 which may include Primary Key field 142, Consumer-Defined Sequence field 144, and Consumer Address {Street, City, Zip, etc.} field 146 for containing such appropriate information. Associated further with this information may be the Consumer Photo field 148, which may link to a digital photograph of the consumer, while Fingerprint(s) field 150 links to digital images of a consumer's fingerprint. Name {Last, Name, Middle Initial} field 154 hold consumer contact information, while, Phone field 154 contains the consumer's telephone number(s). Birth date field 156 contains a consumer's birth date, while Place of Birth field 158 contains the consumer's place of birth. Social Security Number field 160 holds the consumer's social security number. Email Address field 162 receives a consumer's email address, while field 164 provide, in either encrypted or unencrypted form, a consumer-defined password for further private and secure access to the information associated with the various fields 140.

A distinguishing characteristic between trusted service 82 and other services that provide some form of identification is that trusted service 82 operates as an independent service provider. Trusted service 82 is not a government or regulatory entity. A fundamental aspect of the present invention, therefore, is that the consumer owns the consumer identifier 126. Trusted service 82, therefore, validates the integrity, privacy and security of information relating to the consumer identifier 126. The consumer, by using the commercial trusted service, may control who accesses the information that the requesting business might access. Moreover, as opposed to a government entity providing information to any form of requesting entity, trusted service 82 and the associated consumer identifier 126 presents a foundation on which a requesting business 112 or other entity may rely upon the accuracy of the information. At the same time, the consumer exercises control over access to his information and the ramifications of such access.

On one hand, therefore, the present invention provides a way to create and control certifying information relating to a consumer in a manner that is similar to that presently provided social security number or other government-granted official identifier. On the other hand, the present invention provides non-public, consumer identifier 126, to which the consumer controls access. By virtue of having such control, consumer identifier 126 allows the consumer to control access to and use of information associated therewith. Thus, the consumer can prevent unauthorized use of the consumer's identity. This helps alleviate or substantially reduce the likelihood of identity theft occurring in on-line or otherwise open commercial and official transactions and correspondence.

While the present embodiment exhibits the use of a primary key portion 128, a business entity portion 130, and consumer-defined sequence 132, consumer identifier 126 may include other segments that trusted service 82 and the consumer may control in differing degrees. Moreover, different types of technologies incorporating other symbols or other ways of providing an openly accessible, yet privately controllable, consumer identifier 126 are within the scope of the present invention.

Another aspect of the present invention is that requesting business 112 may have access to trusted service 82 for the purpose of accessing the more reliable consumer identifier 126 information. As a result, requesting business 112 benefits from more secure and less challenged information than is presently available. By paying a subscription or access fee to trusted service 82, requesting businesses 112 receives a certain level or scope of access to support obtaining expeditiously the type of information it needs for performing verified invalidated commercial transactions.

Another feature of the present invention is that once a business makes a request to trusted service 82 for validation or verification information relating to the consumer identifier 126, the consumer obtains knowledge of such request through a report or other communication. This helps eliminate spurious or unwanted requests relating to the consumer by preventing such unauthorized requesting business from obtain the information they seek.

As a result of having the ability to modify a consumer portion of the consumer identifier 126, the consumer or user may prevent those who are not authorized to obtain information relating to consumer identifier 126 from obtaining information they seek. In essence, therefore, as unauthorized attempts to access the consumer identifier 126 occur, knowing of such attempts helps make the consumer aware that an identity theft event may be occurring. Still further, by associating consumer identifier 126 with robust algorithms and software at trusted service 82, the present invention makes it possible to determine the origin of attempts to access the consumer identifier 126, as well as to glean from observed behavior that unwanted or unauthorized uses of an individual's identity is occurring. Such behavior may be observed spending patterns or purchase locations, or other data relating to the use of consumer identifier 126.

Another embodiment of the present invention may be to provide the person's name with the consumer identifier 126. This would permit the consumer to have a significant amount of control over the use of his personal and confidential information. The present invention differs from the use of passwords and other security mechanisms of on-line commercial transactions by providing a universally-accepted and useful consumer identifier relating to specific individual as well as the particular private information or commercial information relating to that individual, all through trusted service 82. Thus, the present invention allows the consumer to establish his own digital name.

In the instance where a prior use of a previous consumer identifier 126 has occurred, and a business entity 112 possesses and relies upon a prior consumer identifier 126, the present invention provides the primary key portion 128 and unique business identity portion 130, which do not change. As a result, vendors who use the consumer identify still maintain account information relative to the public key, while separately or independently verifying the consumer-defined sequence 132. In fact, in one embodiment it may be appropriate for the private portion of the key to be embedded or surrounded by portions of the public portion. To do so may make readily apparent to an unwary or unknowledgeable system or individual/thief which portion of consumer identifier 126 represents part of the primary key portion 128 and business identifier 130 and which part forms the consumer-defined sequence 134. Then, in such an embodiment, where the consumer changeable portion of the consumer identifier 126 is embedded within the number, a lookup table or matrix may be used for the purpose of determining which portion of consumer identifier 126 represents a consumer-defined sequence 132 and which are the non-changeable primary key portion 128 and business entity unique identifier 130.

Figure 5:
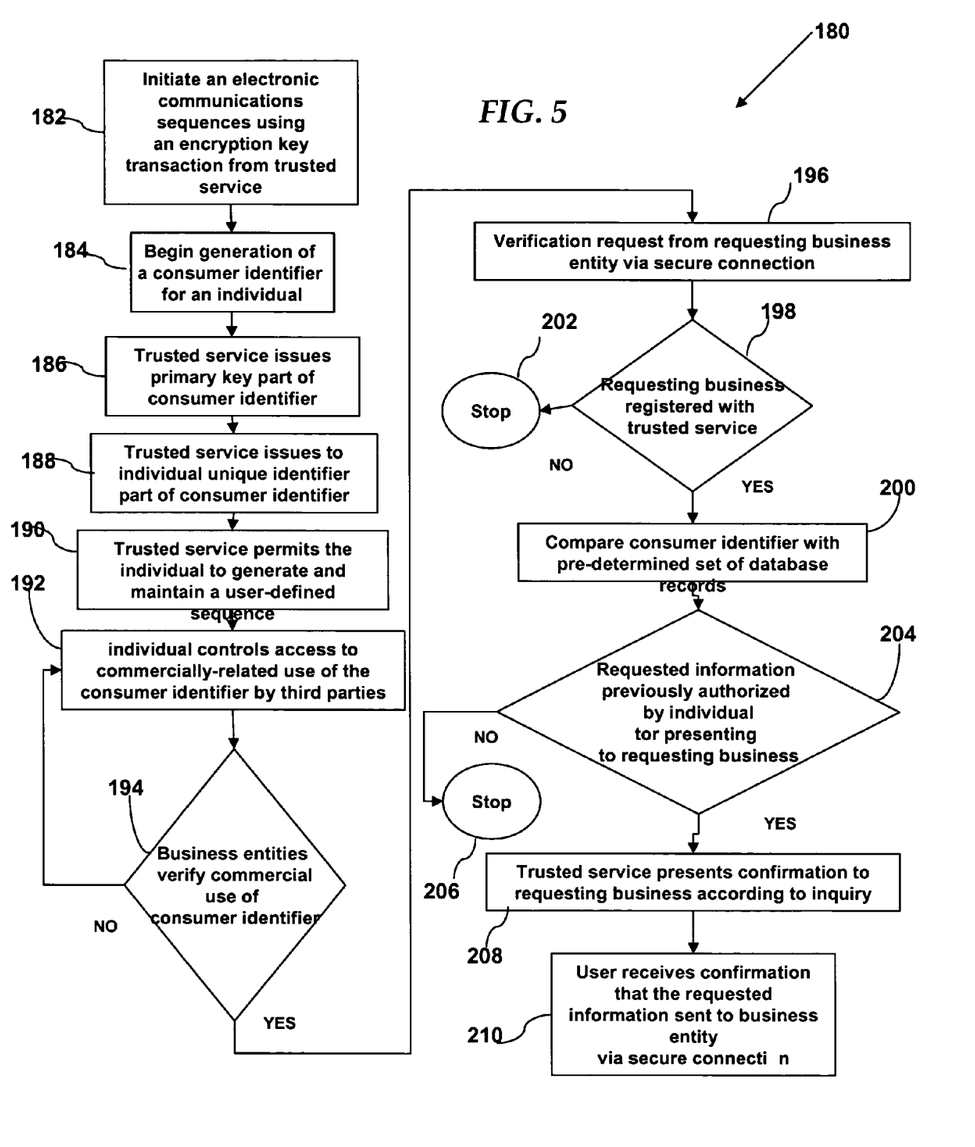
FIG. 5 presents an exemplary process flow for performing the consumer identifier and trusted service functions of the present invention for the purpose of preventing consumer identity theft.

FIG. 5 provides an example of a process that may be used with the consumer identifier 126 of the present invention. Thus, referring to FIG. 5 at step 182, the process of using the consumer identifier 126 may begin with the initiation of an electronic communication sequence using an encrypted key transaction from trusted service 82. Then, at step 184, the process of the present invention begins with the generation of consumer identifier 126 for the individual. At step 186, trusted service 82 issues primary key portion 128 of consumer identifier 126. Then a unique business entity identifier 130 of consumer identifier 126 is issued at step 188. At step 190, trusted service 82 permits the individual to generate and maintain a consumer-defined sequence 132. Then, at step 192, the individual may assume control of the commercially-related use of the consumer identifier 126 by third parties. Thus, an examination follows as to whether the consumer permits business entities 112 to make use of consumer identifier 126, at query 194. If such is allowed, then process flow 180 continues to step 196. Otherwise, the consumer maintains personal control of the consumer identifier 126 until the consumer authorizes such commercial use.

Once the consumer authorizes commercial use, at step 196, for example, the verification request may come from a requesting business 112 via a secure connection. Then, a test, at step 198, occurs as to whether the requested business is registered with trusted service 82. If so, then process flow 180 continues to step 200. Otherwise, processing stops at step 202 until the requesting business is registered with trusted service 82. As may be expected, registration of requesting business 112 with trusted service 82 may entail some form of verification as to the authenticity of such registration information from requesting business 112. Thereafter, at step 200, process flow 180 continues for trusted service 82 to compare consumer identifier 126 with a predetermine set of database records, such as those contained in consumer ID database 86, client ID database information 88, and application database information 90, all of trusted service 82.

At query 204 occurs a determination of whether the requested information was previously authorized by an individual for presenting to requested business 112. If no such authorization has been previously recorded, then process flow 180 goes to step 206, at which no information is returned to requesting business 112. Otherwise, process flow 180 continues to step 208, at which trusted service 82 presents confirmation to requesting business 112 after process flow 180 tests whether to do so is both (i) authorized by the consumer and (ii) requested by requesting business 112. Then, at step 210, the consumer or user receives confirmation of the requested information being sent to requesting business 112 via a secure connection.

Whereas process flow 180 of FIG. 5 illustrates the operation of one aspect of the present invention, there may be other ways in which the consumer may control access to and information relating to consumer identifier 126. Accordingly, process flow 180 of FIG. 5 is merely exemplary in nature, although it shows quite clearly the robust characteristics of the combined consumer control and security aspects of using consumer identifier 126 with trusted service 82. In fact, what follow are two scenarios that further exemplify operations that the present invention makes possible.

In a first situation, a consumer, Maria Brandt, wishes to obtain a loan, in order to build an addition to her home. She researches various lending firms and decides that Huntington National Bank ("HNB") provides a most attractive loan. To prevent potential identity theft, HNB requires only a first level of verification that validates consumer identification for loans below $10,000. Maria completes the loan application providing her name, address, and consumer identifier 126 (e.g. W542-11-R411-Y2-PETS). While reviewing Maria's application, a loan officer logs onto the trusted service 82 secure website at http://www.eds.com/consumer_id/ and enters HNB's identifier, a password, and Maria's consumer identifier 126. After clicking the process/enter button on the consumer identifier 126 web application, trusted service 82 returns the verifying information to the loan officer. Along with providing this information to the loan officer, trusted service 82 provides to Ms. Brandt an acknowledgment verifying the consumer identifier 126 number provided. The consumer identifier 126 application may also include information such as: Maria's Name, address, and photo.

In a second situation, an identity thief, Tim Craftsman, finds the Maria's phone-bill and social security number in trash that came from her home. Tim pieces together Maria's consumer identifier 126 number (W542-11-R411-Y2-2FON) and illegally applies for a credit card application with Easy-Credit Visa. Unknown to Tim, Maria, who was concerned about the theft of her identity, has previously changed her consumer identifier 126 sequence from 2FON to PETS, after her phone service was turned on. The phone service continues to identify her by the consumer identifier 126 number she provided when establishing service. While reviewing Maria's application, the EasyCredit credit manager logs onto EDS's secure website at http://www.eds.com/consumer_id/ and enters EasyCredit's identifier, a password, and Maria's Consumer_ID. After clicking the process/enter button on the consumer identifier 126 web application, trusted service 82 returns the consumer identifier 126 number as invalid to the credit officer.

Along with an acknowledgment of not authenticating this consumer identifier 126 number, trusted service 82 institutes consumer identifier audit procedures by notifying Maria and the authorities of her compromised consumer identifier 126. EasyCredit Visa, in response to receiving the lack of authorization, declines Tim Craftsman's credit application request, thus saving several hundred dollars of fraudulent charges and protecting Maria's credit rating.

The method and system of present invention may be tailored to meet the needs of other organizations requiring identity verification. The present invention addresses many considerations relating to industries, such as those of the credit companies, financial institutions, mortgage companies, government organizations (e.g., Homeland Security, INS, FBI, DoD, FTC), and healthcare services. The present invention also makes feasible the creation of an identification system for foreign nationals under the auspices of the Department of Homeland Security.

In summary, the present invention provides through a trusted service the ability to generate, maintain and control a consumer identifier 126 relating to a particular individual or consumer. The present invention permits the consumer to access consumer identifier 126 through his own secure online communication path and provide identifying information relating to his account. This information authorizes the consumer to modify a predetermined portion of the consumer identifier. As a result of being able to change the consumer identifier, the present invention permits the consumer to control not only the state of the consumer identifier 126, but also who has access to information that consumer identifier 126 makes available.

Furthermore, the present invention addresses the concern of identity theft, which is a significant and rapidly growing threat to electronic commercial transactions, not only as to consumers, but also as to businesses of many sizes and types. The present invention provides an economical and practical technical and business solution to the problem. Accordingly, the embodiments of the invention herein described, it should to be understood, are merely illustrative of the application of the principles of the invention. For example, although the consumer identifier 126 and trusted service 82 of present embodiment employ one or more versions of those systems made by EDS, such as that company's EBX or Electronic Business Exchange System, others may also employ one or more embodiment of the present invention. In addition, the approach used for the consumer identifier 126 function and related encryption and security precautions of the present invention could be extended to other similar electronic commerce systems and tools. Reference herein to details of the illustrated embodiments, therefore, is not intended to limit the scope of the claims, which themselves recite those features regarded as essential to the invention.

I claim:

1. A method for preventing identity theft in electronic communications, comprising the steps of:
   sequencing an encryption key transaction from a trusted service for generating for an individual a consumer identifier by performing the steps of:
      issuing from said trusted service a primary key to the individual;
      issuing to the individual a unique identifier from said trusted service; and
      permitting the individual to generate and maintain a consumer-defined sequence through said trusted service;
   allowing the individual to control access to commercially related use of said consumer identifier by third parties;
   generating a report for presentation to the individual when at least one of the third parties requests access to information related to the consumer identifier; and
   allowing the individual to control which of the third parties that requested access can access information related to the individual.

2. The method of claim 1, further comprising the steps of verifying commercially related use of said consumer identifier, comprising the steps of:
   initiating a verification process from a requesting business entity via a secure connection;
   comparing said consumer identifier with a pre-determined set of database records using said consumer-defined sequence in response to initiating said verification process;
   presenting a positive or negative confirmation to said requesting business, said business having registered with said trusted service; and
   confirming requested information relating to the individual via said secure connection, said requested information having been pre-authorized for presenting to said requesting business entity by the individual.

3. The method of claim 2, further comprising the step of reporting to the individual the number of times at least one requesting business entity has initiated a verification process.

4. The method of claim 2, further comprising the step of confirming requested information relating to the individual including the individual's name, address, and photograph.

5. The method of claim 2, further comprising the step of confirming requested information relating to the individual including the individual's fingerprints.

6. The method of claim 1, further comprising the steps of storing said consumer identifier on a remote business database system and permitting the individual to modify said consumer identifier through a secure connection to a remote location.

7. The method of claim 1, further comprising the step of issuing to the individual a unique identifier from said trusted service according to a pre-determined set of business rules associated with a remote business database system.

8. The method of claim 1, further comprising the step of allowing the individual to control commercial transactions using said consumer identifier.

9. The method of claim 1, further comprising the step of issuing to the individual a unique identifier from said trusted service, said unique identifier conveying encrypted information relating to the individual's age and locale.

10. A system for preventing identity theft in electronic communications, comprising:
a non-transitory computer-readable medium storing one or more instructions, wherein one or more of the instructions comprise:
instructions for sequencing an encryption key transaction from a trusted service for generating for an individual a consumer identifier, said sequencing instructions further comprising:
instructions for issuing from said trusted service a primary key to the individual;
instructions for issuing to the individual a unique identifier from said trusted service; and
instructions for permitting the individual to generate and maintain a consumer-defined sequence through said trusted service; and
instructions for allowing the individual to control access to commercially related use of said consumer identifier by third parties;
instructions for generating a report for presentation to the individual when at least one of the third parties requests access to information related to the consumer identifier; and
instructions for allowing the individual to control which of the third parties that requested access can access information related to the individual.

11. The system of claim 10, wherein one or more of the instructions include instructions for verifying commercially related use of said consumer identifier, comprising:
instructions for initiating a verification process from a requesting business entity via a secure connection;
instructions for comparing said consumer identifier with a pre-determined set of database records using said consumer-defined sequence in response to initiating said verification process;
instructions for presenting a positive or negative confirmation to said requesting business, said business having registered with said trusted service; and
instructions for confirming requested information relating to the individual via said secure connection, said requested information having been pre-authorized for presenting to said requesting business entity by the individual.

12. The system of claim 11, wherein one or more of the instructions include instructions for reporting to the individual the number of times at least one requesting business entity has initiated a verification process.

13. The system of claim 11, wherein one or more of the instructions include instructions for confirming requested information relating to the individual including the individual's name, address, and photograph.

14. The system of claim 11, wherein one or more of the instructions include instructions for confirming requested information relating to the individual including the individual's fingerprints.

15. The system of claim 10, wherein one or more of the instructions include instructions for storing said consumer identifier on a remote business database system and permitting the individual to modify said consumer identifier through a secure connection to a remote location.

16. The system of claim 10, wherein one or more of the instructions include instructions for issuing to the individual a unique identifier from said trusted service according to a pre-determined set of business rules associated with a remote business database system.

17. The system of claim 10, wherein one or more of the instructions include instructions for allowing the individual to control commercial transactions using said consumer identifier.

18. The system of claim 10, wherein one or more of the instructions include instructions for issuing to the individual a unique identifier from said trusted service, said unique identifier conveying encrypted information relating to the individual's age and locale.

19. A non-transitory computer-readable storage medium comprising a system for preventing identity theft in electronic communications, comprising:
instructions stored on said storage medium for sequencing an encryption key transaction from a trusted service for generating for an individual a consumer identifier, said sequencing instructions further comprising:
instructions stored on said storage medium for issuing from said trusted service a primary key to the individual;
instructions stored on said storage medium for issuing to the individual a unique identifier from said trusted service;
instructions stored on said storage medium for permitting the individual to generate and maintain a consumer-defined sequence through said trusted service; and
instructions stored on said storage medium for allowing the individual to control access to commercially related use of said consumer identifier by third parties;
instructions for generating a report for presentation to the individual when at least one of the third parties requests access to information related to the consumer identifier; and
instructions for allowing the individual to control which of the third parties that requested access can access information related to the individual.

20. The non-transitory computer-readable storage medium of claim 19, further comprising, as a part of said identity theft prevention system, instructions stored on said storage medium for verifying commercially related use of said consumer identifier, said verifying instructions comprising:

instructions stored on said storage medium for initiating a verification process from a requesting business entity via a secure connection;

instructions stored on said storage medium for comparing said consumer identifier with a pre-determined set of database records using said consumer-defined sequence in response to initiating said verification process;

instructions stored on said storage medium for presenting a positive or negative confirmation to said requesting business, said business having registered with said trusted service; and     instructions stored on said storage medium for confirming requested information relating to the individual via said secure connection, said requested information having been pre-authorized for presenting to said requesting business entity by the individual.

\* \* \* \* \*